United States Patent [19]
Yu

[11] Patent Number: 5,410,709
[45] Date of Patent: Apr. 25, 1995

[54] MECHANISM FOR REROUTING AND DISPATCHING INTERRUPTS IN A HYBRID SYSTEM ENVIRONMENT

[75] Inventor: Kin C. Yu, Burlington, Mass.

[73] Assignee: Bull HN Information System Inc., Billerica, Mass.

[21] Appl. No.: 992,209

[22] Filed: Dec. 17, 1992

[51] Int. Cl.$^6$ ............................................. G06F 13/24
[52] U.S. Cl. ................... 395/725; 364/230.2; 364/280.8; 364/244.3; 364/254.5; 364/247; 364/DIG. 1
[58] Field of Search ............... 395/725, 325, 275, 800, 395/650, 500

[56] References Cited

U.S. PATENT DOCUMENTS

| | | | |
|---|---|---|---|
| 3,725,864 | 4/1973 | Clark et al. | 395/275 |
| 4,291,371 | 9/1981 | Holtey | 395/725 |
| 4,400,773 | 8/1983 | Brown et al. | 395/275 |
| 4,734,882 | 3/1988 | Romagosa | 395/725 |
| 5,027,271 | 6/1991 | Curley et al. | 364/200 |
| 5,109,522 | 4/1992 | Lent et al. | 395/800 |
| 5,255,372 | 10/1993 | Butter et al. | 395/325 |
| 5,280,588 | 1/1994 | D'Ambrose et al. | 395/275 |
| 5,291,605 | 3/1994 | Takagi et al. | 395/725 |

Primary Examiner—Gopal C. Ray
Attorney, Agent, or Firm—Faith F. Driscoll; John S. Solakian

[57] ABSTRACT

A hybrid system environment includes a proprietary operating system and processing unit and a non-proprietary operating system (UNIX based) and processing unit tightly coupled to a system bus in common with a main memory and a plurality of controllers which include a number of multiline communications controllers and communicates through a common area of main memory. Terminal connections to the communications controllers for virtual terminal processing are made through a UNIX virtual terminal driver and system proprietary communications software components which include a server, network terminal driver (NTD) and multiplexer driver modules. The UNIX based operating system further includes a multiplexer terminal driver and a switching mechanism which is included within the virtual terminal driver. The mechanism enables switching from virtual terminal processing to direct terminal processing wherein communications is established between the multiplexer terminal driver and the communications controllers. An interrupt dispatching mechanism enables interrupts from the controllers to be rerouted to the multiplexer terminal driver and properly dispatched to the driver interrupt handler routines on the basis of line number thereby reducing processing delays.

12 Claims, 6 Drawing Sheets

MECHANISM FOR REROUTING AND DISPATCHING INTERRUPTS IN A HYBRID SYSTEM ENVIRONMENT

RELATED PATENT APPLICATION

The patent application of Kin C. Yu, Charles T. Mighill, Teresa L. C. Wu, Christopher R. M. Bailey and Steven D. Lizotte entitled, "Switching Mechanism for Directly Connected Terminals in a Hybrid System Environment, " filed on Dec. 17 1992, bearing Ser. No. 07/992,945, which is assigned to the same assignee as this patent application.

BACKGROUND OF THE INVENTION

1. Field of Use

The present invention relates to interrupt processing and, more particularly, to interrupt processing within a hybrid system.

2. Prior Art

It has been found desirable to be able to provide data processing systems which incorporate a plurality of central processing units which operated under the control of different operating systems (i.e., operating systems having incompatible characteristics). An example of such a system is one which includes a proprietary operating system and a UNIX*based operating system. In such systems, it is desirable to have the central processing units operate in a peer relationship wherein each processing unit is capable of accessing all of the resources within the entire system. This provides the users with access to a variety of resources and an expanded repertoire of programs without extensive reprogramming efforts or elaborate emulation techniques. An example of such a system is disclosed in U.S. Pat. No. 5,027,271 entitled, "Apparatus and Method for Alterable Resource Partitioning Enforcement in a Data Processing System Having Central Processing Units Using Different Operating Systems," invented by John L. Curley, et al. which issued on Jun. 25, 1991.

In the above system, the character terminal device (TTY) connections for user applications logged on to one of the operating systems (i.e., proprietary operating system) which have switched to the other operating system (i.e., UNIX based operating system) are all UNIX is a registered trademark of X/Open Co. Ltd. "virtual." That is, the original proprietary operating system continues to perform interrupt services for such applications. This has resulted in increased overhead to the proprietary operating system making less time available to its own applications.

Accordingly, it is a primary object of the present invention to provide a system which overcomes the above problems.

It is a more specific object of the present invention to provide more efficient interrupt processing.

SUMMARY OF THE INVENTION

The above objects are achieved in the interrupt dispatcher mechanism of the present invention. The interrupt dispatcher is utilized in the hybrid system disclosed in the related patent application entitled, "A Switching Mechanism for Directly Connected Terminals in a Hybrid System Environment." The interrupt dispatcher mechanism comprises a plurality of components which include an interrupt dispatcher module and an interrupt control table. The dispatcher module includes a function processing module and a dispatching function module. The function processing module operatively connects to a number of device drivers and to the interrupt control table. The dispatching function module operatively couples to a processor interrupt hardware register. The function processing module responds to driver calls issued in connection with performing application open and close operations.

According to the present invention, the interrupt control table is organized on a channel/line basis so as to be indexed by channel number. In the preferred embodiment, the interrupt control table includes a number of groups or sets of locations which corresponds to the maximum number of channels which can be operative in the system. Each group of locations provides storage for user data and interrupt handler information for the channel number being used to index into the table. In the case of a multiline driver, the user data corresponds to line number information.

In response to an open, the function processing module obtains the interrupt level and central processing unit number associated with the particular driver. This information is transferred to each channel of the controller whose terminal issued the open for rerouting controller interrupts to the dispatcher function module for interrupt processing in lieu of having interrupts processed indirectly through the interrupt facilities of another operating system.

Also, the function processing module registers the interrupt handler routines used by the driver with the interrupt dispatcher. This is done by having the function processing module index into the interrupt control table using the controller channel number provided by the driver and writing the required interrupt handler and user data information entries into the designated channel locations. Accordingly, when an interrupt is generated by a controller, the dispatching function module reads the interrupt hardware register to obtain the interrupting channel number. It then indexes into the interrupt control table using the interrupting channel number to obtain the interrupt handler and user data information which is passed onto the interrupt handler routine designated by the interrupt handler information. The interrupt handler routine for the multiline driver is able to use the user data which corresponds to line number information as an index to obtain certain line specific data. Such line specific data is accessed through entries contained in a channel table. By making such line number information available to the interrupt handler routine, such data can be readily accessed from the table using the line number information facilitating interrupt processing.

At the end of a session signalled by a close function, the function processing module using the channel number provided by the driver, indexed into the interrupt, control table and clears the interrupt handler and user data information.

The novel features which are believed to be characteristic of the invention, both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

DETAILED DESCRIPTION OF THE PREFERRED EMBODIMENT

Figure 1:
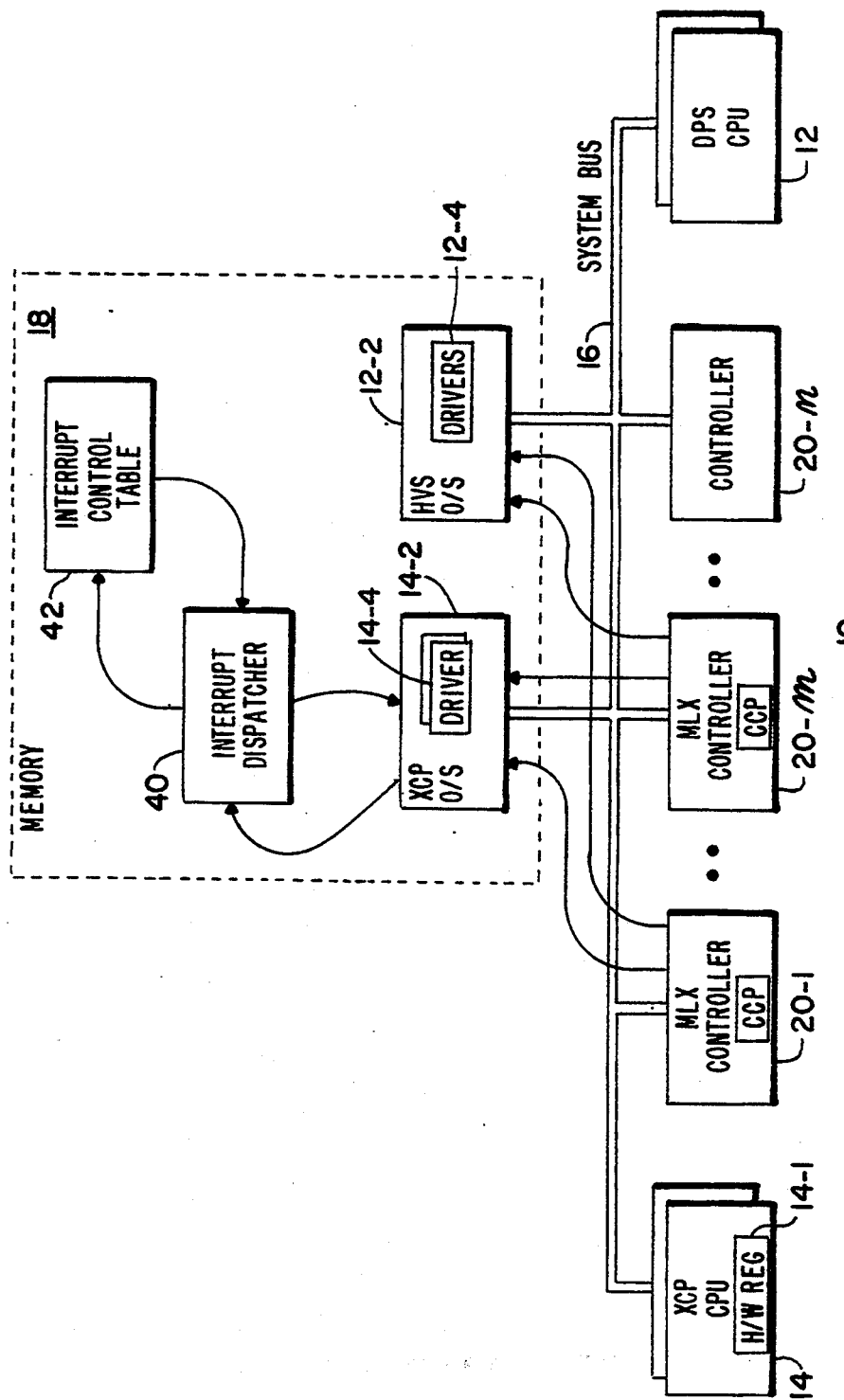
FIG. 1 is a block diagram of a system which includes a preferred embodiment of the interrupt mechanism of the present invention.

FIG. 1 shows in block diagram form, a multiprocessor system environment in which the preferred embodiment of the interrupt dispatcher of the present invention is used. As shown, the system 10 includes a central processing unit 12 and a peer processing unit 14 which tightly couple in common to a system bus 16, a main memory 18 and to a plurality of peripheral controllers 20-1 through 20-n which include a number of communications controllers 20-1 through 20-m. Each processing unit includes a bus interface area which enables the unit to transmit or receive requests in the form of commands, interrupts, data or responses/status to another unit connected to the system bus 16. In the preferred embodiment, the bus 16 operates asynchronously. For further information regarding this type of bus interface and operation, reference may be made to U.S. Pat. No. 3,997,896.

The processing unit 12 functions as a host processor and in the preferred embodiment, such processing unit may take the form of a Bull DPS6000 system which operates under control of the proprietary operating system 12-2 known as the GCOS6 HVS operating system. For further information regarding the HVS operating system, reference may be made to the publication entitled, "HVS6 PLUS System Programmer's Guide Volume 1, Order No. HE05-02, published by Bull HN Information Systems Inc., Copyright 1989. The peer processing unit 14 includes a high performance microprocessor such as the Intel 80486 chip and local memory which operates under the control of a UNIX based operating system 14-2. In the preferred embodiment, such processing unit may take the form of the XCP/486 processor manufactured by Bull HN Information Systems Inc.

In the system of FIG. 1, each processing unit is organized to operate in an independent manner and have access to the full complement of system resources, such as main memory and controllers 20-1 through 20-n. Each of the controllers 20-1 through 20-m are multiline communications controllers, each of which connect to a number of asynchronous terminals, printers and the like. Such controllers operate under the control of channel control programs (CCPs) stored in a random access memory (RAM). These programs are code that directs the programmable controller firmware in the managing one or more of the 256 controller communication channels. In the preferred embodiment, such controllers may take the form of the MLX-16 controllers manufactured by Bull HN Information Systems Inc. Also, this type of controller is generally described in U.S. Pat. No. 4,482,982.

The main memory 18 is divided into an MRX memory region, a common memory region and an XCP memory region. Each of the MRX and XCP regions are divided into a system memory region and a user memory region. The MRX system memory region is reserved for the GCOS6 HVS operating system controlling processing unit 12 while the XCP system memory region is reserved for the UNIX based operating system controlling processing unit 14. The common memory region is accessible to both processing units 12 and 14. For further information concerning this organization, reference may be made to the referenced related patent application and to U.S. Pat. No. 5,027,271.

In the system of FIG. 1, all of the interrupts which originate from the MLX controllers 20-1 through 20-m go to the HVS operating system 12-2. In the preferred embodiment, users can issue switch commands which allows switching of terminal devices from the HVS operating system to the XCP operating system to take place wherein the terminals connected to the controllers which switched operate in a virtual mode. When in this mode, the HVS operating system continues to perform I/O processing for the applications being run on such terminals via a network terminal driver such as driver 12-4. The referenced related patent application provides a mechanism for enabling the automatic direct connection of such terminals to the XCP operating system via a multiplexer terminal (MLX) driver such as driver 14-4 for improving overall system performance.

In the preferred embodiment, the present invention further improves performance by providing a mechanism for rerouting and dispatching interrupts associated with any MLX controller terminal which has been automatically directly connected to driver 14-4. This results in some interrupts being rerouted to the XCP operating system as shown in FIG. 1.

The MLX driver 14-4 includes routines for processing application open, close, write and IOCTL calls in a conventional manner for the purpose of the present invention. The driver 14-4 also includes interface routines for communicating with the communications control programs (CCPs) of the controllers 20-1 through 20-m in addition to a plurality of interrupt handler routines for processing interrupts which have been dispatched by interrupt dispatcher 40 of the present invention. These routines signal the receipt of data and the completion of the open, write and ioctl operations.

Interrupt Dispatcher

Figure 2A:
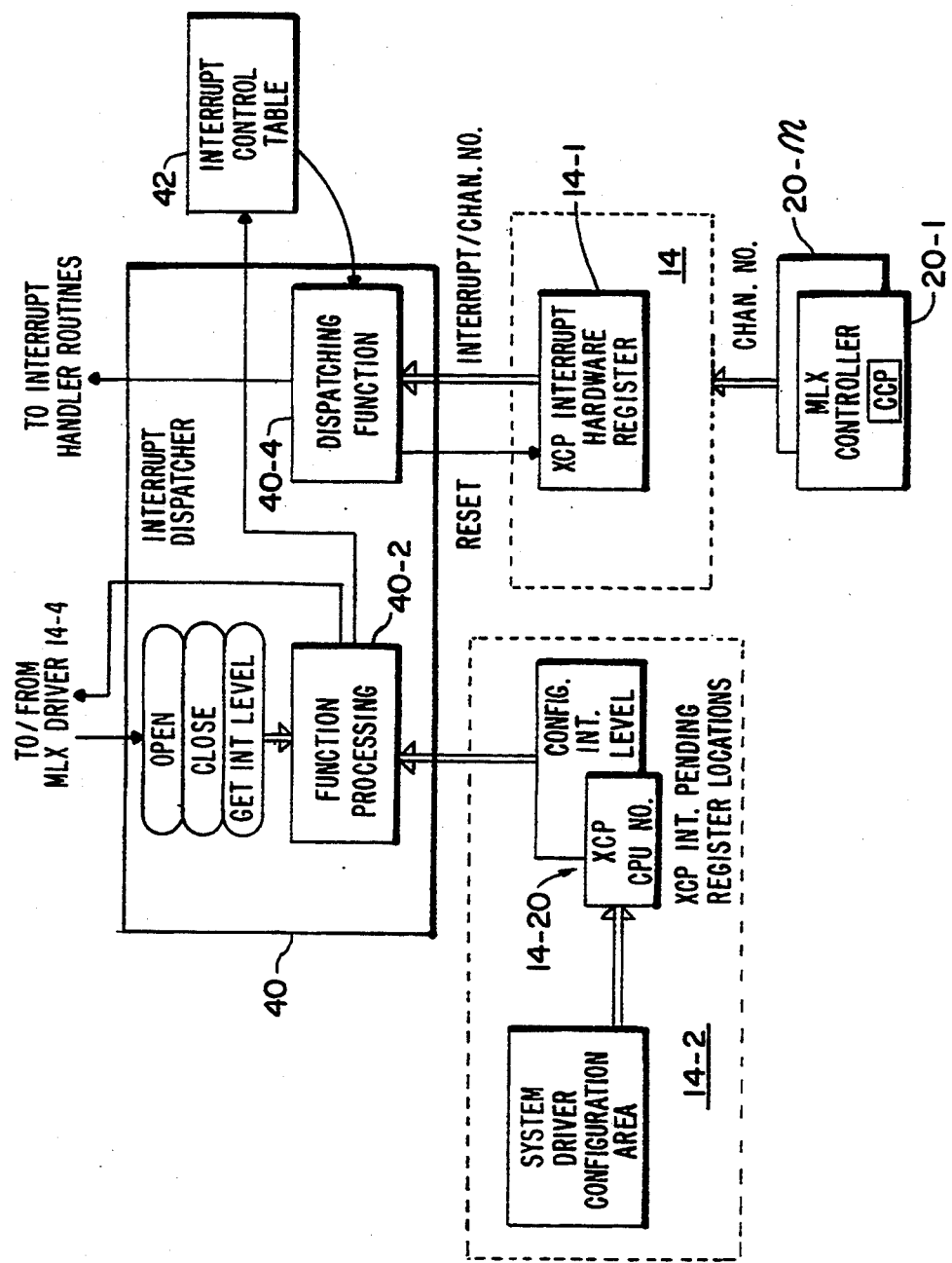
FIGS. 2a and 2b show in greater detail, the driver, interrupt dispatcher and interrupt control table components of FIG. 1.

FIG. 2a shows in greater detail, the interrupt dispatcher 40 of the present invention. As shown, dispatcher 40 includes a function processing module 40-2 and a dispatching function module 40-4. The function processing module 40-2 includes routines for processing open, close and get interrupt level calls from MLX driver 14-4. The module 40-2 operatively couples to a plurality of XCP interrupt pending register locations 14-20 which are used to store XCP CPU number and configuration interrupt level information associated with the driver 14-4 obtained from a system driver configuration area 14-2 of memory. When the system is initialized, the information defining the collection of device drivers linked with the XCP operating system 14-2 when the kernel is generated is stored in the system driver configuration area 14-20 of memory. In the system of the preferred embodiment, all of the controllers 20-1 through 20-m utilize a single interrupt level which is shared by all of the XCP operating system drivers. This minimizes the impact on the limited number of interrupt levels provided by XCP central processing unit 14.

The dispatching function module 40-4 contains routines for dispatching interrupts received from controller channel control programs loaded into an XCP interrupt hardware register 14-1 included within XCP central processing unit 14. More specifically, the interrupt received by the XCP central processing unit 14 causes the referencing of one of 16 interrupt vectors from memory. The interrupt vector containing the channel number information is loaded into the register 14-1. The module 40-4 responds to the interrupt, obtains the matching channel number and invokes the corresponding driver interrupt handler routine. Both modules 40-2 and 40-4 operatively couple to the interrupt control table 42. The function processing module 40-2 accesses the table 42 to store and clear entries while module 40-4 accesses the table 42 in dispatching interrupts to the appropriate driver handler routines.

Interrupt Control Table

Figure 2B:
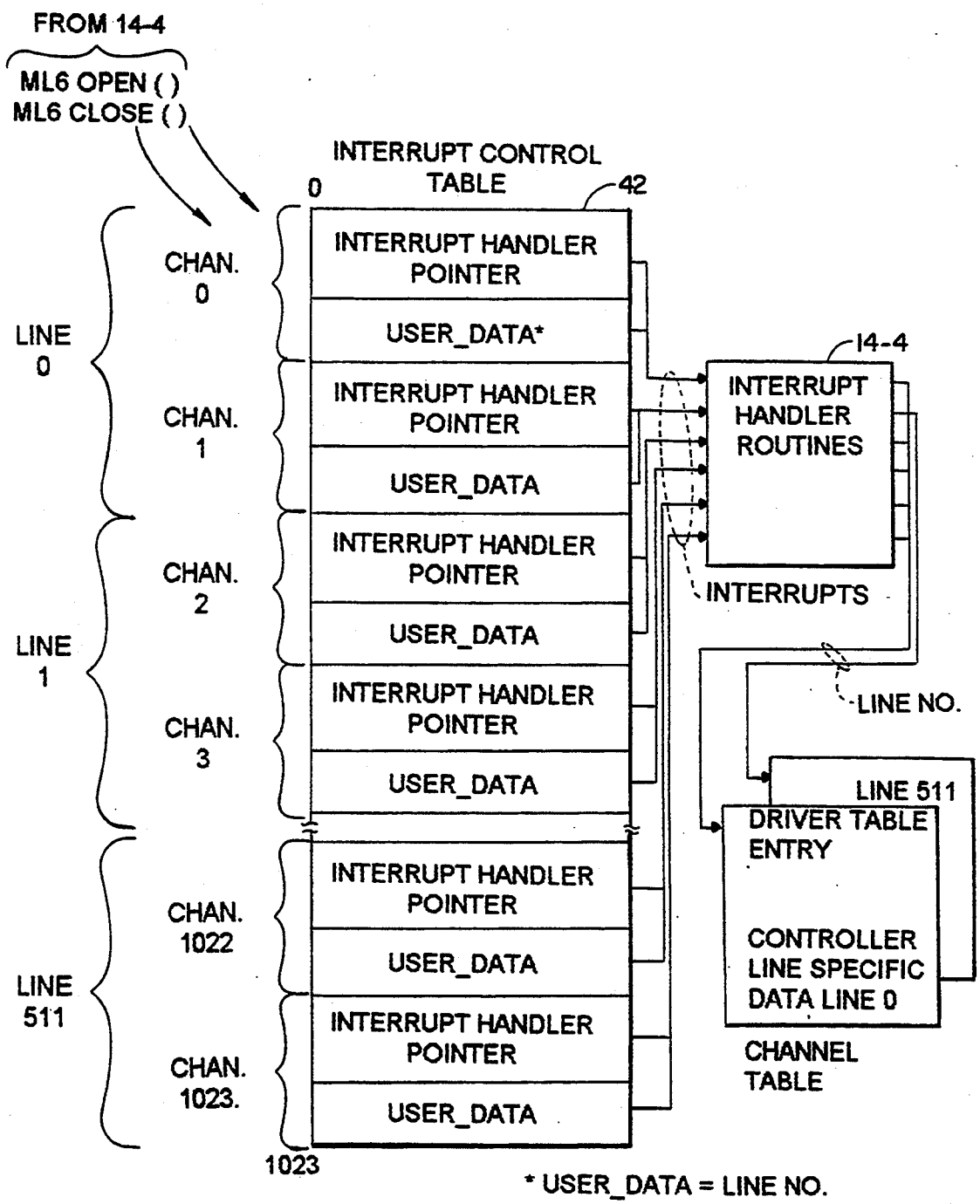

FIG. 2b shows in greater detail, the interrupt control table 42. A shown, the table 42 has up to 1024 channels or sets of entries. This corresponds to the maximum number of channels contained within the peripheral controllers 20-1 through 20-n of FIG. 1. The system of FIG. 1 provides up to 511 possible line/device connections. Each such connection utilizes two channels, a transmit channel and a receive channel. The channels and associated line connections are indicated in FIG. 2b. The last significant bit of the channel number designates whether the channel is a transmit, receive or channel (0=transmit; 1=receive).

Each set of entries represents a different one of the 1024 channels. As shown, each channel has two entries. The first entry contains information pertaining to the driver interrupt handler itself (i.e., a pointer to the function). The second entry contains user data information which, in the case of multiline driver entries, corresponds to a line number value. The line number value dynamically changes as a function of the interrupts to be processed coming in from controllers 20-1 through 20-m. That is, the interrupt dispatcher module 40-2 fills and removes channel entries in response to calls from driver MLX 14-4 to enable the processing of interrupts as described herein.

The dispatching function module 40-4 accesses the channel entries for dispatching interrupts to the designated driver interrupt handler routines of block 14-4. As explained herein, the interrupt handler routines are able to directly access the appropriate line specific data using the user data information for efficient interrupt processing.

The line specific data is included in a number of parameter structure blocks (PSBs) which are included as part of a channel table whose entries are organized according to logical line number. More specifically, each MLX parameter structure block contains the line specific data utilized by the MLX driver module 14-4. There can be up to 512 such structures (2 per device connection) enabling the MLX driver module to concurrently handle a large number of communications operations involving different ones of the controllers 20-1 through 20m. The MLX parameter structure block includes a plurality of 16 bit fields. These include line state field, interrupt control word fields, a receive and transmit data buffer word fields, a field to keep track of any outstanding read, a channel number field, and the CCP address field for designating line specific tables. The data structure also includes four line configuration byte fields wherein byte0 defines the type of line (e.g. 8/7 bits, half/full duplex, parity detection, RS232/RS422 connections, etc.), byte1 contains the adapter ID, byte2 defines the data rate, byte3 defines the character configuration and byte4 defines the character size, a flow control word field for defining transmit/receive flow, connect CCP addresses field, data CCP addresses field, trap CCP addresses field, a MLX firmware revision field, an input mode flags field, a control mode flags field and a modem table information field used for CCP connects.

DESCRIPTION OF OPERATION

With reference to FIGS. 1 through 2b, the operation of the interrupt dispatcher mechanism will be described using the flow charts of FIGS. 3a through 3c. It is assumed that the XCP processing unit 14 and its associated operating system 14-2 have been initialized. As part of such initialization, the channel structure is declared and a structure containing 1024 channel structures is also declared. This results in the creation of interrupt control table 42.

Figure 3A:
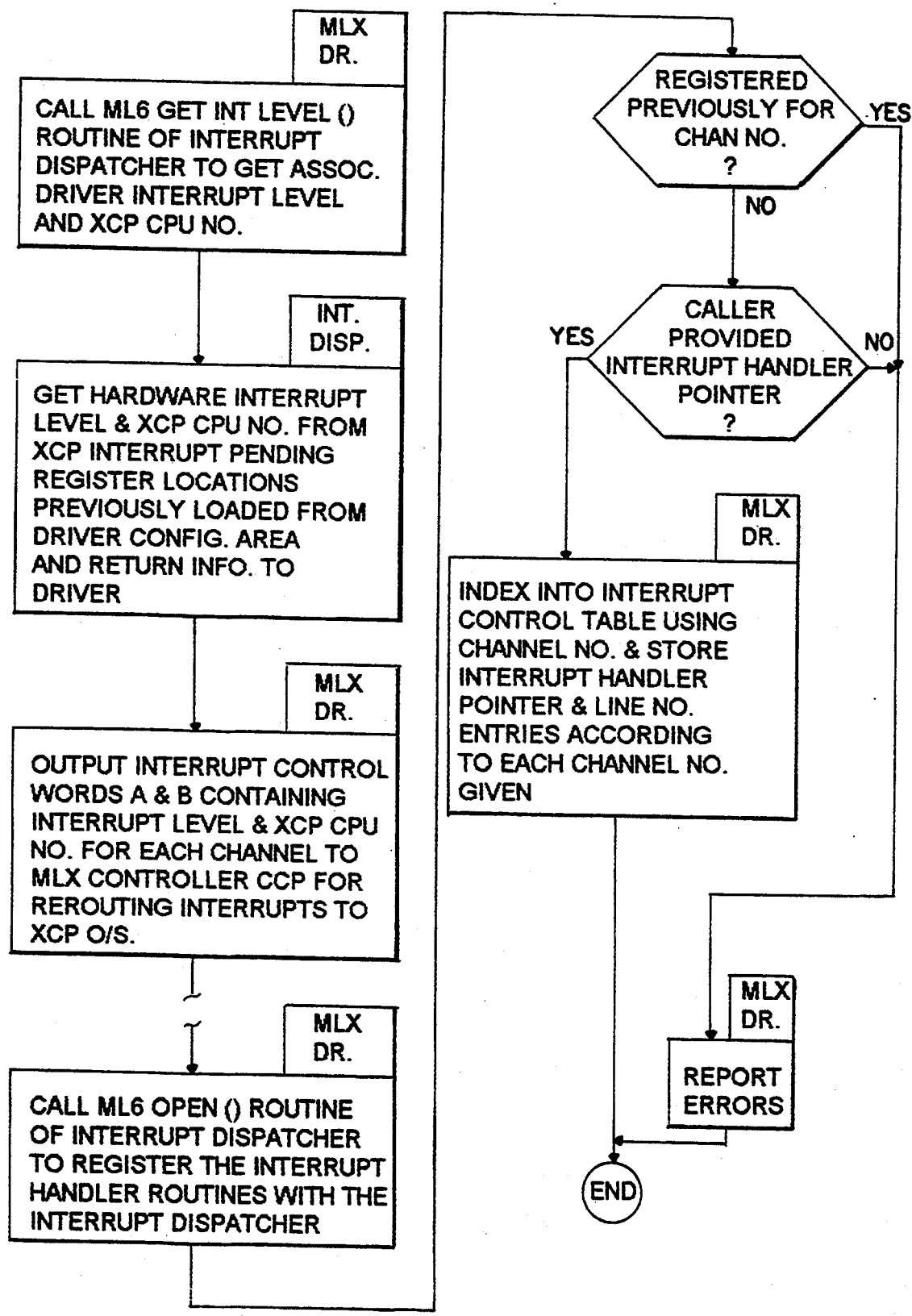
FIGS. 3a through 3c are flow charts used to describe the operation of the present invention.

As shown in FIG. 3a, in response to an XCP user application, an open is issued to the MLX driver 14-4. The MLX driver 14-4 in turn issues a call to interrupt dispatcher 40 to obtain the XCP CPU number and interrupt level associated with the driver. This causes the function processing module 40-2 to invoke its m16 getintlevel () routine for obtaining the interrupt level and XCP CPU number information from configuration area 14-22.

This is followed by reading the contents of the preset register locations 14-20 which are passed onto driver 14-4. The channel information pertaining to interrupt level and XCP CPU number are incorporated into a pair of interrupt control words A and B for the transmit and receive channels. The interrupt control words A and B for transmit and receive channels are then transferred to the CCP of the MLX controller associated with the activated user terminal connection. This information is stored by the controller CCP and is used by the terminal transmit and receive channels for generating interrupts. This operation reroutes interrupts from the HVS operating system 12-2 to the XCP operating system 14-2.

Next, the MLX terminal driver 14-4 registers its interrupt handler routines with the interrupt dispatcher 40. More specifically, it calls the m16 open () routine of the function processing module 40-2 to register the interrupt handler routines for both the receive and transmit channels. The 10-bit channel number in bit order appears as follows: cccc cccc cc00 0000. As shown, the module 40-2 indexes into the interrupt control table using the transmit and receive channel numbers and stores the interrupt handler and user data entries into the locations of the interrupt control table according to channel number.

As shown in FIG. 3a, the interrupt dispatcher module 40 determines if an interrupt handler is already registered for the terminal channels and whether the interrupt handler information is being provided by the calling driver. If these conditions are correctly met, the interrupt handler information is stored in the interrupt control table 42 along with the provided user data information. If either no interrupt handler information or an interrupt handler was already registered for the specified channel, the dispatcher module 40 generates an appropriate error message. The operations described above are carried out for each of the transmit and receive channels. Once registration has taken place, interrupts received from the controller channel can now be processed.

Figure 3B:
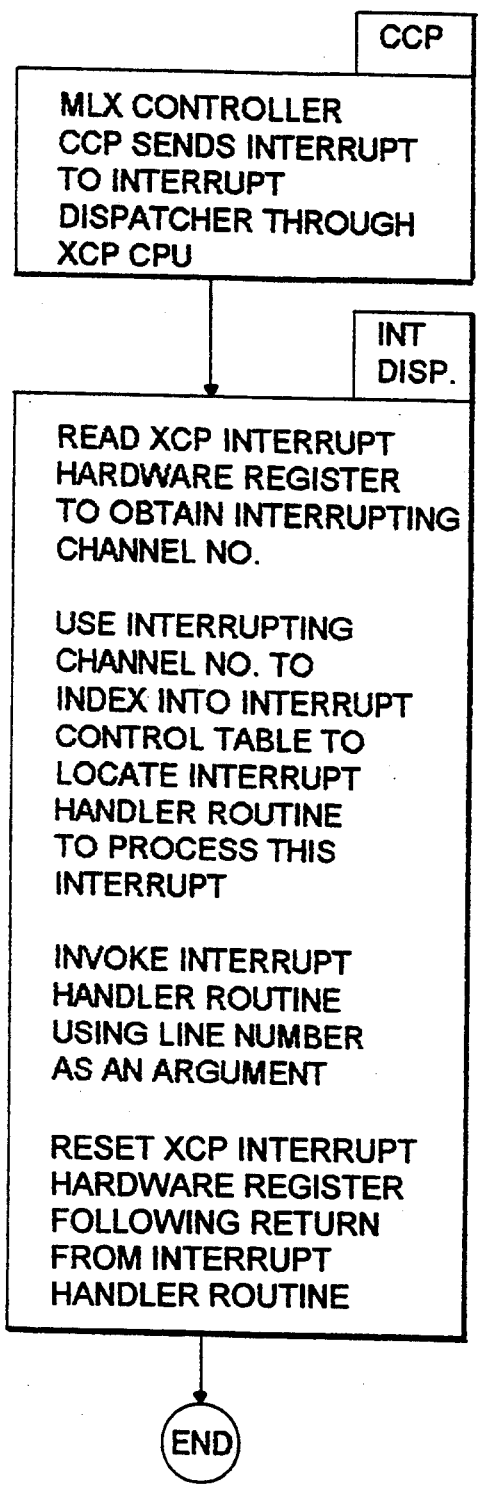
Figure 3C:
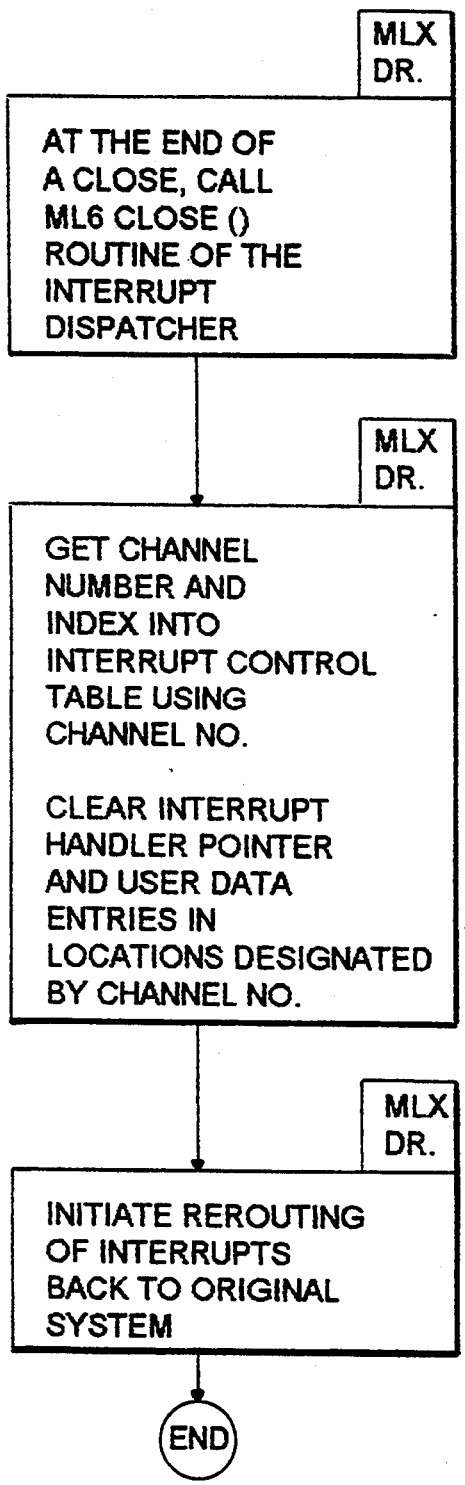

FIG. 3b illustrates the operations performed by the dispatching function module 40-4 in processing interrupts. After each data transfer operation or after each command processed by a controller channel control program, an interrupt will be generated. When the interrupt is generated, the controller CCP loads the XCP interrupt hardware register 14-1 with the number of the interrupting channel and assigned interrupt level. As shown in FIG. 3b, the dispatching function module 40-4 first reads the contents of register 14-1 to obtain the channel number. Next, it indexes into the interrupt control table 42 using the channel number to locate the specific interrupt handler routine to process the interrupt. This operation is followed by dispatching the interrupt along with the user data information to the interrupt handler routine. As part of this operation, the module 40-4 determines that there is an interrupt handler for the channel. If there is not, an error message is generated.

The interrupt handler routine uses the line number to locate the specific parameter structure block from the channel table. That is, it uses the line number value as an index to quickly locate the controller line specific parameter data structure block for the connected line. The interrupt handler routine includes routines for identifying the function causing the interrupt in order to establish if it is a level A or B interrupt and its status. The interrupt handler checks for the cause of the interrupt and processes it accordingly. At the completion of interrupt processing, the module 40-4 sends a reset interrupt command to the XCP central processing unit 14. This provides a strobe to an interrupt routine which resets the XCP interrupt hardware register 14-1. This enables the processing of a next interrupt.

By including routines in the interrupt handler routine for identifying the functions associated with two types of interrupts, this permits the use of a single interrupt level. The interrupt dispatcher 40 continues to process interrupts for a terminal until the user terminates the session by causing the generation of a driver close call. In response to the close call, driver 14-4 initiates the operations of FIG. 3c. As shown, this invokes the m16close () routine which indexes into the interrupt control table 42 and clears out the interrupt handler and user data entries for the specified transmit and receive channels. Next, the MLX driver 14-4 initiates rerouting of interrupts back to the original operating system. This involves issuing I/O commands to stop the controller channel control programs from performing any further operations enabling reloading of the channel programs back to the original state.

The above has shown how the interrupt dispatcher of the present invention is able to facilitate interrupt processing within a hybrid system environment. The table driven arrangement of the present invention makes it possible to add channels in addition to other information which facilitates interrupt processing. For example, where it is desirable to use more than one interrupt level for prioritizing interrupts, the interrupt dispatcher is able to accommodate such changes. Also, the interrupt dispatcher of the present invention may be used with different drivers. The driver need only to have a channel number contained within the interrupt control table and provide the appropriate interrupt handler reference information and user data information, as desired.

It will be appreciated by those skilled in the art that many changes may be made to the preferred embodiment of the present invention without departing from its teachings. For example, the interrupt dispatcher mechanism may be used with other types of drivers.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. An interrupt dispatcher mechanism for use in a data processing system which comprises a first central processing unit (CPU) operating under the control of a first operating system, a main memory and a number of controllers having a plurality of lines connected to a number of terminals, said number of controllers being tightly coupled to said first CPU and to said main memory, a common hardware interrupt register operatively connected to said plurality of controllers for receiving interrupt requests therefrom, each interrupt request including channel number information designating an interrupting controller, said main memory, a first memory area for storing system and application components including a number of terminal drivers for operatively connecting to said first operating system controller terminals previously connected to operate under a second operating system which is different in said data processing system from said first operating system and operates under the control of a second CPU of said data processing system, said interrupt dispatcher mechanism comprising:

an interrupt control table having a plurality of groups of locations organized on a channel basis so as to be indexed according to channel number;

an interrupt dispatcher module including a function processing module and a dispatching function module, said function processing module being operatively coupled to said number of terminal drivers and to said interrupt control table and said dispatching function module being operatively coupled to said common hardware interrupt register, to said number of terminal drivers and to said interrupt control table, said function processing module in response to each first type of call from one of said drivers including a channel number designating a controller channel on which an open command from said driver was received, said function processing module using said channel number to index into said interrupt control table for registering interrupt handlers utilized by said driver by writing into locations designated by said channel number, interrupt handler and user data information; and, said dispatching function module in response to each interrupt subsequently received from any one of said controllers stored in said hardware interrupt register, indexing into said interrupt control table using said channel number for obtaining said interrupt handler and user data information required for dispatching said interrupt to an interrupt handler designated by said information.

2. The system of claim 1 wherein said first memory area further includes a number of interrupt pending register locations for storing processing unit number and interrupt level information linked with each of said number of drivers, said function processing module including means in response to each second type of call from said driver made in response to said open command, reading said interrupt pending register locations, said function processing module returning said processing unit and interrupt level information to said driver for transfer to each channel of one of said controllers corresponding to one of said terminals which caused said open command to be issued for automatically rerouting all controller channel interrupts to said dispatcher interrupt mechanism.

3. The system of claim 2 wherein each of said controllers includes a memory for storing a plurality of channel control programs (CCPs) for controlling activities of a corresponding number of channels, said driver upon receipt of said processing unit and interrupt level information issuing to each channel, a plurality of interrupt control words containing said interrupt control information to replace previously stored interrupt control words for use by a corresponding one of said CCPs in generating interrupt request for said channels.

4. The system of claim 3 wherein said system includes a plurality of first processing units, each designated by a different central processing number and wherein said first operating system utilizes a plurality of interrupt levels for allocating processing priorities, said interrupt control information including a central processing number designating which of said plurality of first processing units is assigned for processing all interrupts from said controller and an interrupt level designating processing priority.

5. The system of claim 1 wherein said function processing module further includes termination routine means in response to a third type of call received from said driver indicating receipt of a close command, indexing into said interrupt control table using said channel number, said termination routine means deregistering said interrupt handlers utilized by said driver by clearing those locations designated by said channel number.

6. The system of claim 1 wherein said user data information includes line number information designating which one of said plurality of lines is being serviced by said channel and wherein said first memory area includes a table containing a plurality of entries, each containing information pertaining to the status of a different one of said lines, said dispatching function module passing said line number information to said interrupt handler designated by said information for accessing line specific data structures through said channel table for facilitating processing of said interrupt.

7. The method of claim 1 wherein said information entries stored in said interrupt control table are coded to designate any one of a number of different interrupt handlers for processing interrupts.

8. The method of claim 1 wherein said information entries stored in said interrupt control table are coded to designate a common interrupt handler for processing interrupts.

9. A method of facilitating dispatching of interrupts received by a terminal driver from any one of a number of multiline controllers during the execution of application programs by a data processing system which includes a central processing unit operating under the control of a first operating system and a main memory for storing said first operating system, said method comprising the steps of:

(a) creating an interrupt control table having a plurality of locations for storing information entries on a channel basis;

(b) storing interrupt dispatcher routines in said main memory accessible to said terminal driver, said routines including a number of function processing routines and a number of interrupt dispatching routines;

(c) issuing in response to each open command received by said terminal driver, a first type of call to said interrupt dispatcher routines;

(d) registering in response to said first call, an interrupt handler of said driver by said function processing routines which is to process said interrupts by indexing into said interrupt control table using channel number information provided by said driver and storing information entries in locations designated by said channel number, said information entries designating driver interrupt handlers for processing said interrupts and predetermined user data information for facilitating said processing; and, (e) indexing into said interrupt control table in response to each interrupt received from one of said controllers by said interrupt dispatching routines using channel number information provided by said one of said controllers for obtaining said information entries in locations designated by said channel number to dispatch said interrupt to an interrupt handler designated by said driver for processing said interrupt.

10. The method of claim 9 wherein said step (c) of said method further includes the step of said terminal driver issuing a second type of call to said interrupt dispatcher routines and wherein step (d) of said method further includes the steps of:

(f) in response to said second type of call, said function processing routines obtaining driver configuration information from said memory corresponding to predetermined processing unit and interrupt level information linked with said driver; and, (g) transferring said predetermined processing unit and interrupt level information to said one of said controllers for automatically rerouting all controller channel interrupts to said dispatcher interrupt routines for processing.

11. The method of claim 9 wherein said method further includes the steps of:

(h) in response to a third type of call received from said driver indicating receipt of a close command from an application, indexing into said interrupt control table using said channel number; and, (i) deregistering said interrupt handlers utilized by said driver for processing interrupts received from the channel by clearing the entries stored in those locations designated by said channel number.

12. The method of claim 7 wherein said information entries include line number information and wherein said memory includes a table containing a plurality of entries, each storing information pertaining to the status of a different one of a plurality of lines, said step (e) of said method further including the step of passing said line number information as an argument to said interrupt handler and said interrupt handler using said line number information to access said table for facilitating processing of said interrupt.

* * * * *